(12) United States Patent
Tyler et al.

(10) Patent No.: US 10,723,073 B2
(45) Date of Patent: Jul. 28, 2020

(54) SYSTEM AND METHOD FOR ADDITIVELY MANUFACTURING A COMPOSITE STRUCTURE

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 150 days.

(21) Appl. No.: 15/874,036

(22) Filed: Jan. 18, 2018

(65) Prior Publication Data

US 2018/0207865 A1 Jul. 26, 2018

Related U.S. Application Data

(60) Provisional application No. 62/449,899, filed on Jan. 24, 2017.

(51) Int. Cl.
*B29C 41/20* (2006.01)
*B29C 70/70* (2006.01)
(Continued)

(52) U.S. Cl.
CPC ............ *B29C 64/165* (2017.08); *B29C 48/08* (2019.02); *B29C 48/30* (2019.02); *B29C 48/305* (2019.02); *B29C 48/35* (2019.02); *B29C 64/106* (2017.08); *B29C 64/118* (2017.08); *B29C 64/124* (2017.08); *B29C 64/129* (2017.08); *B29C 64/135* (2017.08); *B29C 64/209* (2017.08);
(Continued)

(58) Field of Classification Search
CPC ... B29C 64/118; B29C 64/124; B29C 64/129; B29C 64/135; B29C 70/68; B29C 71/02; B29C 71/04; B29C 41/20; B29C 70/683; B29C 70/70
USPC .................. 264/85, 236, 255, 308, 401, 494
See application file for complete search history.

(56) References Cited

U.S. PATENT DOCUMENTS

| 3,286,305 A | 11/1966 | Seckel |
| 3,809,514 A | 5/1974 | Nunez |

(Continued)

FOREIGN PATENT DOCUMENTS

| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Leo B Tentoni
(74) *Attorney, Agent, or Firm* — Ryan C. Stockett

(57) ABSTRACT

A system for additively manufacturing a composite part is disclosed. The system may include a vat configured to hold a supply of resin, and a build surface disposed inside the vat. The system may also include a print head configured to discharge a matrix-coated continuous reinforcement onto the build surface, and an energy source configured to expose resin on a surface of the matrix-coated continuous reinforcement to a cure energy.

19 Claims, 2 Drawing Sheets

(51) Int. Cl.

| | | |
|---|---|---|
| *B29C 71/02* | (2006.01) | |
| *B29C 71/04* | (2006.01) | |
| *B29C 64/165* | (2017.01) | |
| *B29C 64/135* | (2017.01) | |
| *B29C 64/209* | (2017.01) | |
| *B33Y 10/00* | (2015.01) | |
| *B33Y 30/00* | (2015.01) | |
| *B29C 64/371* | (2017.01) | |
| *B29C 48/08* | (2019.01) | |
| *B29C 48/30* | (2019.01) | |
| *B29C 48/35* | (2019.01) | |
| *B29C 48/305* | (2019.01) | |
| *B29C 64/245* | (2017.01) | |
| *B29C 64/124* | (2017.01) | |
| *B29C 70/24* | (2006.01) | |
| *B29C 70/38* | (2006.01) | |
| *B29C 64/129* | (2017.01) | |
| *B29C 70/68* | (2006.01) | |
| *B33Y 50/02* | (2015.01) | |
| *B33Y 70/00* | (2020.01) | |
| *B29C 64/214* | (2017.01) | |
| *B29C 64/264* | (2017.01) | |
| *B29C 64/118* | (2017.01) | |
| *B29C 64/393* | (2017.01) | |
| *B29C 64/106* | (2017.01) | |
| *B29C 64/336* | (2017.01) | |
| *B29C 70/06* | (2006.01) | |
| *B29C 64/218* | (2017.01) | |
| *B29K 105/10* | (2006.01) | |
| *B29K 105/00* | (2006.01) | |
| *B22F 7/06* | (2006.01) | |
| *B22F 3/00* | (2006.01) | |
| *B33Y 80/00* | (2015.01) | |
| *B22F 3/10* | (2006.01) | |
| *B22F 3/11* | (2006.01) | |
| *B29C 64/227* | (2017.01) | |
| *B29K 105/08* | (2006.01) | |
| *B33Y 40/00* | (2020.01) | |
| *B29B 15/12* | (2006.01) | |

(52) U.S. Cl.
CPC .......... *B29C 64/214* (2017.08); *B29C 64/218* (2017.08); *B29C 64/245* (2017.08); *B29C 64/264* (2017.08); *B29C 64/336* (2017.08); *B29C 64/371* (2017.08); *B29C 64/393* (2017.08); *B29C 70/06* (2013.01); *B29C 70/24* (2013.01); *B29C 70/382* (2013.01); *B29C 70/384* (2013.01); *B29C 70/683* (2013.01); *B33Y 10/00* (2014.12); *B33Y 30/00* (2014.12); *B33Y 50/02* (2014.12); *B33Y 70/00* (2014.12); *B22F 3/008* (2013.01); *B22F 3/1035* (2013.01); *B22F 3/1118* (2013.01); *B22F 7/06* (2013.01); *B22F 2999/00* (2013.01); *B29B 15/122* (2013.01); *B29C 64/227* (2017.08); *B29K 2105/0058* (2013.01); *B29K 2105/08* (2013.01); *B29K 2105/101* (2013.01); *B33Y 40/00* (2014.12); *B33Y 80/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,236,637 A | 8/1993 | Hull |
| 5,296,335 A | 3/1994 | Thomas et al. |
| 5,340,433 A | 8/1994 | Crump |
| 5,529,471 A | 6/1996 | Khoshevis |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 7,892,474 B2 | 2/2011 | Shkolnik et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0292862 A1 | 11/2013 | Joyce |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |

(56) References Cited

U.S. PATENT DOCUMENTS

| | | |
|---|---|---|
| 2015/0102532 A1 | 4/2015 | DeSimone et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0264724 A1* | 9/2018 | Feller .................. B29C 64/135 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016184997 A1 | 11/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

(56) References Cited

OTHER PUBLICATIONS

S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
International Search Report dated May 11, 2018 for PCT/US18/14483 to CC3D LLC Filed Jan. 19, 2018.

\* cited by examiner

SYSTEM AND METHOD FOR ADDITIVELY MANUFACTURING A COMPOSITE STRUCTURE

RELATED APPLICATIONS

This application is based on and claims the benefit of priority from U.S. Provisional Application No. 62/449,899 that was filed on Jan. 24, 2017, the contents of which are expressly incorporated herein by reference.

TECHNICAL FIELD

The present disclosure relates generally to a manufacturing system and method and, more particularly, to a system and method for additively manufacturing a composite structure.

BACKGROUND

Many different processes of additive manufacturing are commonly used to produce machine components. These processes may include, among others, Continuous Fiber 3D Printing (CF3D™) and Stereolithography (SLA).

CF3D™ involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

SLA also involves the use of a light-emitting device (e.g., a UV light projector, an electron beam emitter, or a laser). The light-emitting device is computer controlled to selectively energize a layer of resin within a vat in a particular pattern corresponding to an outline of a part. The resin (e.g., a liquid photo-polymerizing resin) solidifies upon being energized, and a subsequent layer of resin within the tank is them energized in a new pattern. This may continue, with the part being incrementally raised out of or lowered further into the vat, until all layers of the component have been fabricated. Parts produced via SLA may have high-resolution surface finishes.

Although parts fabricated via CF3D™ and SLA may have some desired characteristics (e.g., high-strength and high-resolution, respectively), neither process alone may be able to provide all desired characteristics of both processes. The disclosed system is directed at addressing one or more of the problems set forth above and/or other problems of the prior art.

SUMMARY

In one aspect, the present disclosure is directed to an additive manufacturing system. The additive manufacturing system may include a vat configured to hold a supply of resin, and a build surface disposed inside the vat. The system may also include a print head configured to discharge a matrix-coated continuous reinforcement onto the build surface, and an energy source configured to expose resin on a surface of the matrix-coated continuous reinforcement to a cure energy.

In another aspect, the present disclosure is directed to a method of additively manufacturing a composite structure. The method may include discharging from a print head a matrix-coated continuous reinforcement onto a build surface, and submerging the matrix-coated continuous reinforcement in resin. The method may also include exposing resin at a surface of the matrix-coated continuous reinforcement to a cure energy.

DETAILED DESCRIPTION

Figure 1:
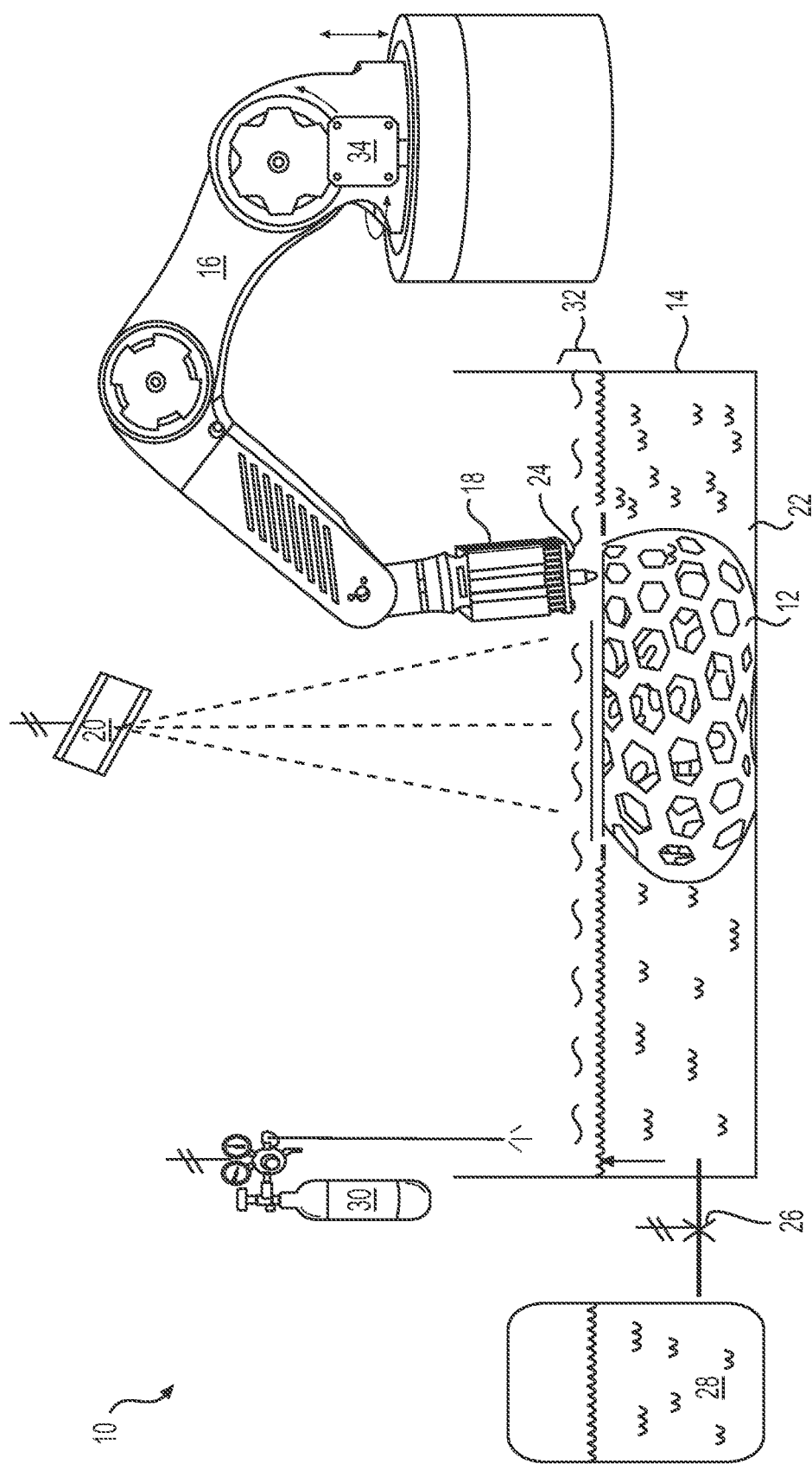
FIG. 1 is a diagrammatic illustration of an exemplary disclosed additive manufacturing system.

FIG. 1 illustrates an exemplary system 10, which may be used to continuously manufacture a composite structure 12 having any desired cross-sectional shape (e.g., circular, polygonal, etc.). System 10 may include at least a vat 14, a support 16, a head 18, and an energy source 20. Vat 14 may be a vessel that is configured to hold a supply of resin (e.g., a photopolymer resin), from which at least a portion (e.g., a surface coating) of structure 12 is to be fabricated. Head 18 may be coupled to and moved by support 16 to fabricate at least a portion (e.g., an internal skeleton) of structure 12 within vat 14. In the disclosed embodiment of FIG. 1, support 16 is a robotic arm capable of moving head 18 in multiple directions during fabrication of structure 12. Energy source 20 may be configured to selectively expose resin in vat 14 that coats the structural skeleton fabricated by head 18, thereby causing the resin to cure and form a hardened coating on the skeleton.

Head 18, itself, may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 18 may be pressurized, for example by an external device (e.g., an extruder or another type of pump—not shown) that is fluidly connected to head 18 via a corresponding conduit (not shown). In another embodiment, however, the matrix pressure may be generated completely inside of head 18 by a similar type of device. In yet other embodiments, the matrix may be gravity-fed through and/or mixed within head 18. In some instances, the matrix inside head 18 may need to be kept cool and/or dark to inhibit premature curing; while in other instances, the matrix may need to be kept warm for the same reason. In either situation, head 18 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 18.

The reinforcements may be exposed to (e.g., coated with) the matrix while the reinforcements are inside head 18, while the reinforcements are being passed to head 18 (e.g., as a prepreg material), and/or while the reinforcements are discharging from head 18, as desired. The matrix, dry reinforcements, and/or reinforcements that are already exposed to the matrix (e.g., wetted reinforcements) may be transported into head 18 in any manner apparent to one skilled in the art.

The matrix and reinforcement may be discharged from head 18 via at least two different modes of operation. In a first mode of operation, the matrix and reinforcement are extruded (e.g., pushed under pressure and/or mechanical force) from head 18, as head 18 is moved by support 16 to create the 3-dimensional shape of structure 12. In a second mode of operation, at least the reinforcement is pulled from head 18, such that a tensile stress is created in the reinforcement during discharge. In this mode of operation, the matrix may cling to the reinforcement and thereby also be pulled from head 18 along with the reinforcement, and/or the matrix may be discharged from head 18 under pressure along with the pulled reinforcement. In the second mode of operation, where the matrix is being pulled from head 18, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 18 as a result of head 18 moving away from a build surface 22. In particular, at the start of structure-formation, a length of matrix-impregnated reinforcement may be pulled and/or pushed from head 18, deposited onto a build surface 22 within vat 14, and cured, such that the discharged material adheres to build surface 22. Thereafter, head 18 may be moved away from build surface 22, and the relative movement may cause the reinforcement to be pulled from head 18. It should be noted that the movement of the reinforcement through head 18 could be assisted (e.g., via internal feed mechanisms), if desired. However, the discharge rate of the reinforcement from head 18 may primarily be the result of relative movement between head 18 and build surface 22, such that tension is created within the reinforcement. It is contemplated that build surface 22 could be moved away from head 18 instead of or in addition to head 18 being moved away from build surface 22.

One or more cure enhancers (e.g., one or more light sources, an ultrasonic emitter, a laser, a heater, a catalyst dispenser, a microwave generator, etc.) 24 may be mounted proximate (e.g., on and/or trailing from) head 18 and configured to enhance a cure rate and/or quality of the matrix as it is discharged from head 18. Cure enhancer 24 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from head 18.

During the fabrication of structure 12 by head 18, the internal skeleton may be incrementally submerged within the resin of vat 14. For example, after fabrication of each horizontal layer of structure 12, the level of the resin in vat 14 may be raised by a height of the new layer. The level of resin in vat 14 may be regulated by selectively allowing (e.g., by opening and closing a valve 26) additional resin to enter vat 14 from a supply 28.

After the raising of the resin level within vat 14, energy source 20 may be selectively regulated to cause curing of the resin that coats the new layer of structure 12. Energy source 20 may be, for example, a UV light projector, a laser, an electron beam emitter, and/or another source that is controlled to expose select surfaces of only the new layer of structure 12 that was just fabricated by head 18.

It should be noted that energy source 20 and cure enhancer(s) 24 may produce the same type and magnitude of cure energy, or different types and magnitudes of cure energy, as desired. In one exemplary embodiment, energy source 20 is an array of lasers (e.g., at least three different blue lasers) that focus light energy having a wavelength of about 430-470 nm together at particular points within vat 14 to cause nearly instantaneous solidification and curing of the resin within vat 14. In this same embodiment, one or more UV lights may function as cure enhancers 24, to expose the matrix to light having a wavelength of about 365-405 nm. In other embodiments, combinations of acoustic energy, heat, and/or light may be used together, if desired.

In some applications, care should be taken to avoid oxygen-exposure of the matrix inside the composite material of structure 12, prior to coating of the new layer with cured resin from vat 14. In these applications, a shield gas (e.g., an inert gas such as argon, helium, nitrogen, etc.) may be directed from a gas supply 30 into vat 14, in an amount sufficient to create a barrier 32 over structure 12.

A controller 34 may be provided and communicatively coupled with support 16, head 18, energy source 20, cure enhancers 24, valve 26, and/or gas supply 30. Controller 34 may embody a single processor or multiple processors that include a means for controlling an operation of system 10. Controller 34 may include one or more general- or special-purpose processors or microprocessors. Controller 34 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 34, including power supply circuitry, signal-conditioning circuitry, solenoid/motor driver circuitry, communication circuitry, and other appropriate circuitry. Moreover, controller 34 may be capable of communicating with other components of system 10 via wired and/or wireless transmission.

One or more maps may be stored in the memory of controller 34 and used during fabrication of structure 12. Each of these maps may include a collection of data in the form of models, lookup tables, graphs, and/or equations. In the disclosed embodiment, the maps are used by controller 34 to determine desired characteristics of energy source 20, cure enhancers 24, the associated matrix and resin, and/or the associated reinforcements at different locations within structure 12. The characteristics may include, among others, a type, quantity, and/or configuration of reinforcement, matrix, and/or resin to be discharged at a particular location within structure 12; an amount, intensity, shape, and/or location of desired curing; and/or a location and thickness of any surface coatings to be generated by energy source 20. Controller 34 may then correlate operation of support 16 (e.g., the location and/or orientation of head 18), the discharge of material from head 18 (a type of material, desired performance of the material, cross-linking requirements of the material, a discharge rate, etc.), the operation of energy source 20, the operation of cure enhancers 24, and/or the operation of valve 26, such that structure 12 is produced in a desired manner.

Figure 2:
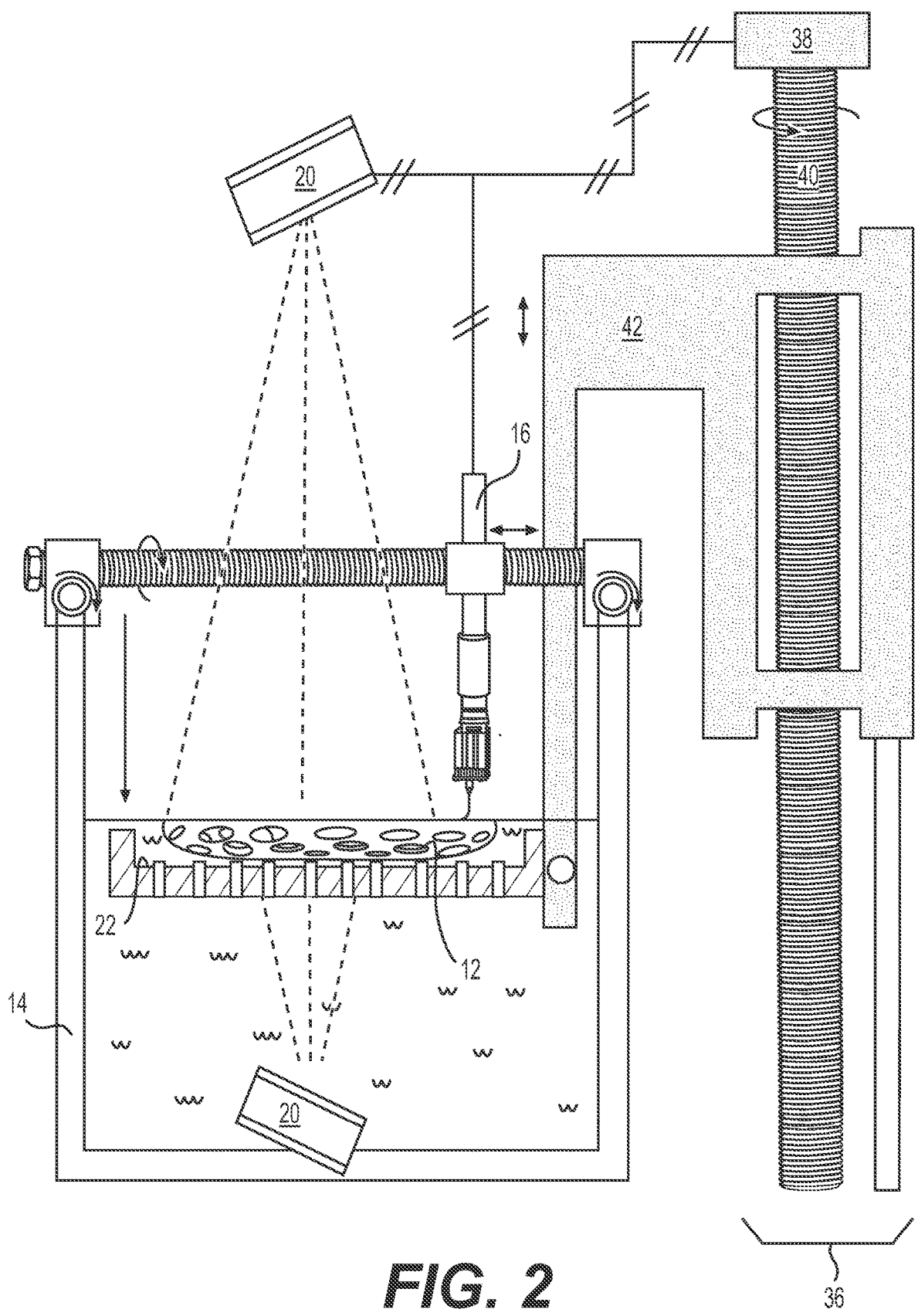
FIG. 2 is a diagrammatic illustration of another exemplary disclosed additive manufacturing system.

Another embodiment of system 10 is disclosed in FIG. 2. Like the embodiment of FIG. 1, system 10 of FIG. 2 may also include vat 14, support 16, head 18, and energy source 20. However, in contrast to FIG. 1, system 10 of FIG. 2 may include an additional support 36 that is connected to move build surface 22. In this embodiment, the level of resin within vat 14 may remain substantially constant, and support 36 may be selectively activated by controller 34 to incrementally lower build surface 22 and structure 12 into the resin after fabrication of each new layer of structure 12 by head 18. Support 36 may take any form known the art, for example an elevator having an external motor 38 that is connected to the end of a lead screw 40, and one or more brackets 42 transforming a rotation of lead screw 40 into a lowering of build surface 22.

In one example, build surface 22 may be at least partially transparent and/or perforated. The partially transparent surface may allow for cure energy from a second energy source 20 (e.g., a source located below build surface 22) to pass through build surface 22 and expose a lower end of structure 12. The perforated nature of build surface 22 may allow for resin to flow from a lower section of vat 14 to an upper section, by way of build surface 22, during lowering of building surface 22.

Also in contrast to the embodiment of FIG. 1, support 16 may take a different form. For example, support 16 may embody a gantry that is located at an upper end of vat 14. In this embodiment, support 16 may function to only move head 18 transversely (e.g., in X- and Y-directions). It is contemplated, however, that support 16 could have another configuration (e.g., a hybrid gantry/arm configuration), if desired.

INDUSTRIAL APPLICABILITY

The disclosed system may be used to continuously manufacture composite structures having any desired cross-sectional size, shape, length, density, strength and/or surface texture. The composite structures may include any number of different reinforcements of the same or different types, diameters, shapes, configurations, and consists, each coated with a common matrix and/or resin. Operation of system 10 will now be described in detail.

At a start of a manufacturing event, information regarding a desired structure 12 may be loaded into system 10 (e.g., into controller 34 that is responsible for regulating operations of system 10). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into head 18, and vat 14 may be filled with a specific amount and/or type of resin.

Installation of the reinforcement may be performed by passing the reinforcements down through print head 18. Installation of the matrix may include filling head 18 with matrix and/or coupling of an extruder (not shown) to head 18. Head 18 may then be moved by support 16 under the regulation of controller 34 to cause matrix-coated reinforcements to be placed against or on a corresponding build surface 22. Cure enhancers 24 within head 18 may then be selectively activated to cause hardening of the matrix surrounding the reinforcements, thereby bonding the reinforcements to build surface 22.

The component information may then be used to control operation of system 10. For example, the reinforcements may be pulled and/or pushed from head 18 (along with the matrix), while support 16 selectively moves head 18 in a desired manner during exposure of the matrix-coated reinforcement to cure energy, such that an axis of the resulting structure 12 follows a desired trajectory.

In some situations, an outer coating on structure 12 may be beneficial. The outer coating may provide, for example, a desired surface texture (e.g., smoothness), a desired property (e.g., hardness, conductivity, etc.), or a desired appearance (e.g., sheen) that cannot be created via the discharge of matrix-coated reinforcement from head 18 alone.

As each layer of matrix-coated reinforcement is deposited by head 18 and cured, controller 34 may cause the layer to be selectively coated with resin from vat 14 (e.g., by increasing the resin level or by lowering build surface 22 incrementally). Thereafter, one or more of energy sources 20 may be situated to flash a pattern onto the just-submersed layer of structure 12 (e.g., from above, below, and/or a side of structure 12), thereby causing the resin in vat 14 to solidify at the surface of the submersed layer.

It is contemplated that, rather than the outer coating described above being applied layer-by-layer, as head 18 creates structure 12, the outer coating could be applied after all of structure 12 has been created. For example, the completed structure 12 may be lowered into vat 14 (e.g., all at once or one level at a time), and a desired pattern flashed on the completed outer surface of structure 12 to create the coating. The pattern may be flashed layer-by-layer onto the completed surface of structure 12, or flashed all at once, as desired. It should also be noted that the coating processes of FIGS. 1 and 2 may be used for more than coating structure 12. That is, the processes may allow entirely new features to extend from and/or built on top of structure 12, albeit structures without fiber-reinforcement. In addition, it may be possible for layers of matrix-coated reinforcement to be interleaved with any number of adjacent layers of only cured resin, if desired. Once structure 12 has grown to a desired length, structure 12 may be disconnected (e.g., severed) from head 18 in any desired manner.

It will be apparent to those skilled in the art that various modifications and variations can be made to the disclosed additive manufacturing system. Other embodiments will be apparent to those skilled in the art from consideration of the specification and practice of the disclosed additive manufacturing system. It is intended that the specification and examples be considered as exemplary only, with a true scope being indicated by the following claims and their equivalents.

What is claimed is:

1. A method of additively manufacturing a composite structure, comprising:
    discharging from a print head a matrix-coated continuous reinforcement onto a build surface;
    submerging the matrix-coated continuous reinforcement in resin;
    exposing resin at a surface of the matrix-coated continuous reinforcement to a cure energy; and
    exposing a matrix in the matrix-coated continuous reinforcement to cure energy to at least partially cure the matrix prior to submerging the matrix-coated continuous reinforcement in resin.

2. The method of claim 1, further including incrementally lowering the matrix-coated continuous reinforcement into the resin.

3. The method of claim 2, further including passing resin through the build surface during incremental lowering of the matrix-coated continuous reinforcement.

4. The method of claim 2, further including incrementally raising a level of resin inside a vat housing the build surface.

5. The method of claim 4, further including moving the print head inside the vat.

6. The method of claim 1, further including interleaving cured layers of the matrix-coated continuous reinforcement with cured layers of the resin.

7. A method of additively manufacturing a composite structure, comprising:
    discharging from a print head a matrix-coated continuous reinforcement onto a build surface;
    submerging the matrix-coated continuous reinforcement in resin;
    exposing resin at a surface of the matrix-coated continuous reinforcement to a cure energy; and
        at least partially curing all of the matrix-coated continuous reinforcement prior to curing of any resin on the surface of the matrix-coated continuous reinforcement.

8. The method of claim 1, wherein exposing resin at the surface of the matrix-coated continuous reinforcement to the cure energy includes directing the cure energy through the build surface.

9. The method of claim 1, further including generating an oxygen inhibiting barrier at a surface of the resin.

10. A method of additively manufacturing a composite structure, comprising:
    discharging from a matrix-coated continuous reinforcement onto a build surface;
    at least partially submerging the matrix-coated continuous reinforcement in resin;
    curing the resin; and
    exposing a matrix in the matrix-coated continuous reinforcement to cure energy to at least partially cure the matrix prior to at least partially submerging the matrix-coated continuous reinforcement in resin.

11. The method of claim 10, wherein exposing the matrix to cure energy includes directing light into the matrix.

12. The method of claim 10, further including incrementally lowering the matrix-coated continuous reinforcement into the resin.

13. The method of claim 12, further including passing resin over the build surface during incremental lowering of the matrix-coated continuous reinforcement.

14. The method of claim 10, further including incrementally raising a level of resin inside a vat housing the build surface.

15. The method of claim 10, further including interleaving cured layers of the matrix-coated continuous reinforcement with cured layers of the resin.

16. A method of additively manufacturing a composite structure, comprising:
    discharging from a matrix-coated continuous reinforcement onto a build surface;
    at least partially submerging the matrix-coated continuous reinforcement in resin;
    curing the resin; and
    at least partially curing all of the matrix-coated continuous reinforcement prior to curing of any resin.

17. The method of claim 10, wherein curing resin includes directing cure energy through the build surface.

18. The method of claim 17, wherein the cure energy is UV light.

19. The method of claim 10, further including generating an oxygen inhibiting barrier at a surface of the resin.

* * * * *